H. C. REYNOLDS.
Manufacture of Axes.
No. 49,156.
Patented Aug. 1, 1865.
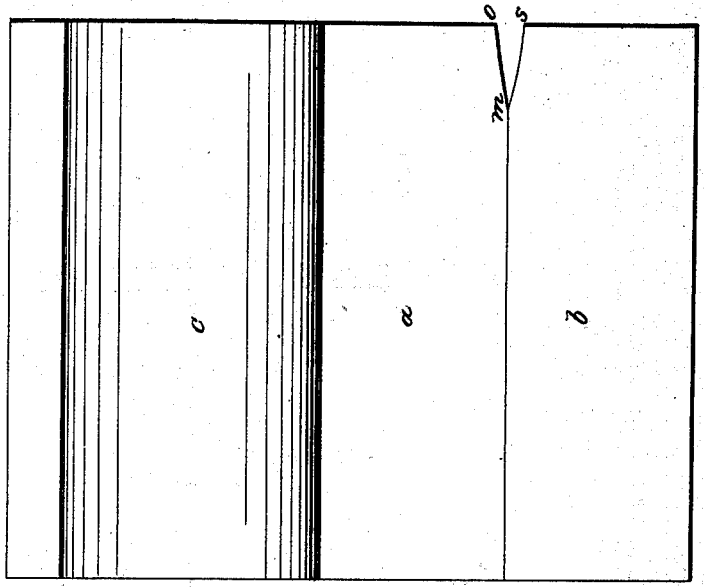
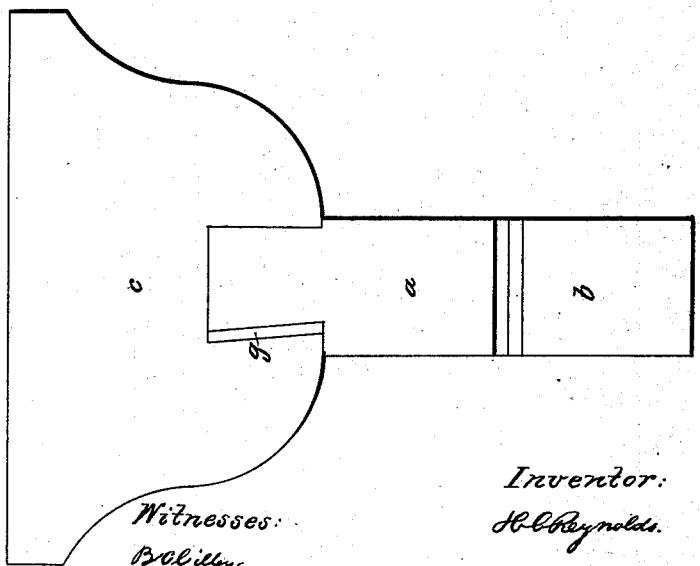

UNITED STATES PATENT OFFICE.

HENRY C. REYNOLDS, OF MANCHESTER, NEW HAMPSHIRE.

IMPROVEMENT IN MANUFACTURE OF AXES.

Specification forming part of Letters Patent No. 49,156, dated August 1, 1865.

*To all whom it may concern:*

Be it known that I, HENRY C. REYNOLDS, of Manchester, in the county of Hillsborough and State of New Hampshire, have invented a new and Improved Mode of Manufacturing the Cutting-Edges of Common Chopping-Axes and other Edge-Tools; and I do hereby declare that the following is a full and accurate description thereof.

Herewith is submitted a drawing illustrating, as well as the nature of the invention admits, the mode or process I adopt, on which like letters represent similar parts in the several figures.

Figure I is a front view of a part of a trip-hammer and the dies attached to the same. Fig. II is a side view of the same.

My invention contemplates the manufacture of common chopping-axes by means of trip or drop hammers driven by power; and it is first necessary to describe the usual mode of forming the edge of such axes in order to understand what I claim as new and useful in the progress of such manufacture.

After the ax is prepared for the reception of its steel the steel is inserted in the usual way into the ax, and both are heated to the desired temperature for welding the steel. The ax is then placed upon dies under trip-hammers for the purpose of forming and drawing it to the desired shape at the time the steel is being welded. After being so formed and welded the cutting-edge of the ax is reduced and refined with common hand-hammers with plain surfaces, or it may be so reduced with similar trip-hammers, and it is sometimes necessary to reheat the steel in order to reduce the edge as much as desired; but whether reheated or not, the edge of the ax reduced by plain surfaces must necessarily be left of a much greater thickness than desired, when it is finished into the usual form of a convex surface—the most durable form for a cutting or chopping edge. The convex form of the edge is now produced by grinding off this thick edge left by the hammers, and reducing it by grinding after the ax is cooled to the convex shape desired for use. Any hammering, as described, must leave the surface of the ax with straight sides, tapering toward the cutting part in form of an angle made with straight lines, and no plain-faced hammer can leave the ax otherwise; and the edges of axes have been heretofore left in this way at the welding-heat, or at what is called the "finishing-heat," a heat subsequent to the welding, and then, after being cooled, ground down to the desired curve—an expensive and slow process. To obviate in a great measure this grinding process, and to make the edge of axes of a uniform shape and of equal refinement at the same heat the ax is welded and formed, as above described, I place the edge of the ax under dies corresponding to the exact shape desired for the edge when finished and fit for use, and reduce and refine the edge, as hereinafter described.

To enable persons skilled in the art to use my invention, I will now proceed to describe the manner of forming the edge of the ax and refining the same.

I construct two dies, *a* and *b*, Figs. I and II, for use under trip-hammers, resting and fastening *b* on a firm immovable bed, and attaching *a* by means of key *g*, Fig. I, to the head of trip-hammer *c*, Fig. I. These dies are secured in any usual way of operating same with trip-hammers. The under side of *a*, Fig. II, and the upper side of *b*, Fig. II, are cut out at either end of the dies, (only one end being so shown in the drawings,) so as to leave the dies of the exact counterpart desired for the form of the edge of the ax when finished, and a section or side of this form is shown by the convex lines *o m* and *m s*, Fig. II. These dies are about one inch in thickness in front from right to left, Fig. I, for purposes hereinafter mentioned. Now, when the ax is heated, as before mentioned, for welding, and has passed through the forming and welding process, I take it immediately to *b*, resting one corner of its edge on *b*, introducing the edge as far as practicable toward *m*, Fig. II, and then apply the hammer or upper die, *a*. As *a* moves up and down in rapid blows on *b* the edge of the ax is passed along *b* back and forth over the blade of the ax by the hands of the operative until the edge of the ax is pounded into the convex form corresponding to the lines *s m o*, Fig. II—that is to say, until a transverse section of any part of the edge of the ax will give the convex form shown by *o m* and *m s*, joining at *m*. This forming of the edge is the work only of a moment, but it is in practice at just the precise time when the steel from the heat of its welding is at the desired red heat for reducing and refining the edge of the ax. $a$ and $b$ are made of the thickness described, as all experience shows that steel is best refined and reduced by striking it with small surfaces and rapid blows. A further advantage in reducing the edge by means of dies is, that the work is better done, every ax being finished alike, and the opportunity of slighting the work on the part of the operative is much less than when finished in any other manner heretofore adopted. The length of the lines $s\,m$ and $o\,m$ are about one inch, or such as the curvature of the edge of the tool when finished for use requires. I contemplate using at this same welding-heat other dies in a similar manner cut out for forming the edges or blades of different edge-tools for the purpose of reducing, refining, and fashioning the edge of such tools.

I do not claim as new any part of the process or progress of manufacturing axes except the forming, reducing, and refining the edge or cutting part at the time the steel is under the same heat that is required for welding it to the ax.

What I claim, and desire to secure by Letters Patent, is—

Reducing the edge of the ax to the form desired when it is finished for use, and refining the steel at the same heat the steel is welded to the ax by means of dies $a$ and $b$, constructed and operated substantially as herein described.

H. C. REYNOLDS.

Witnesses:
JAMES A. WESTON,
B. P. CILLEY.